United States Patent Office 2,861,767
Patented Nov. 25, 1958

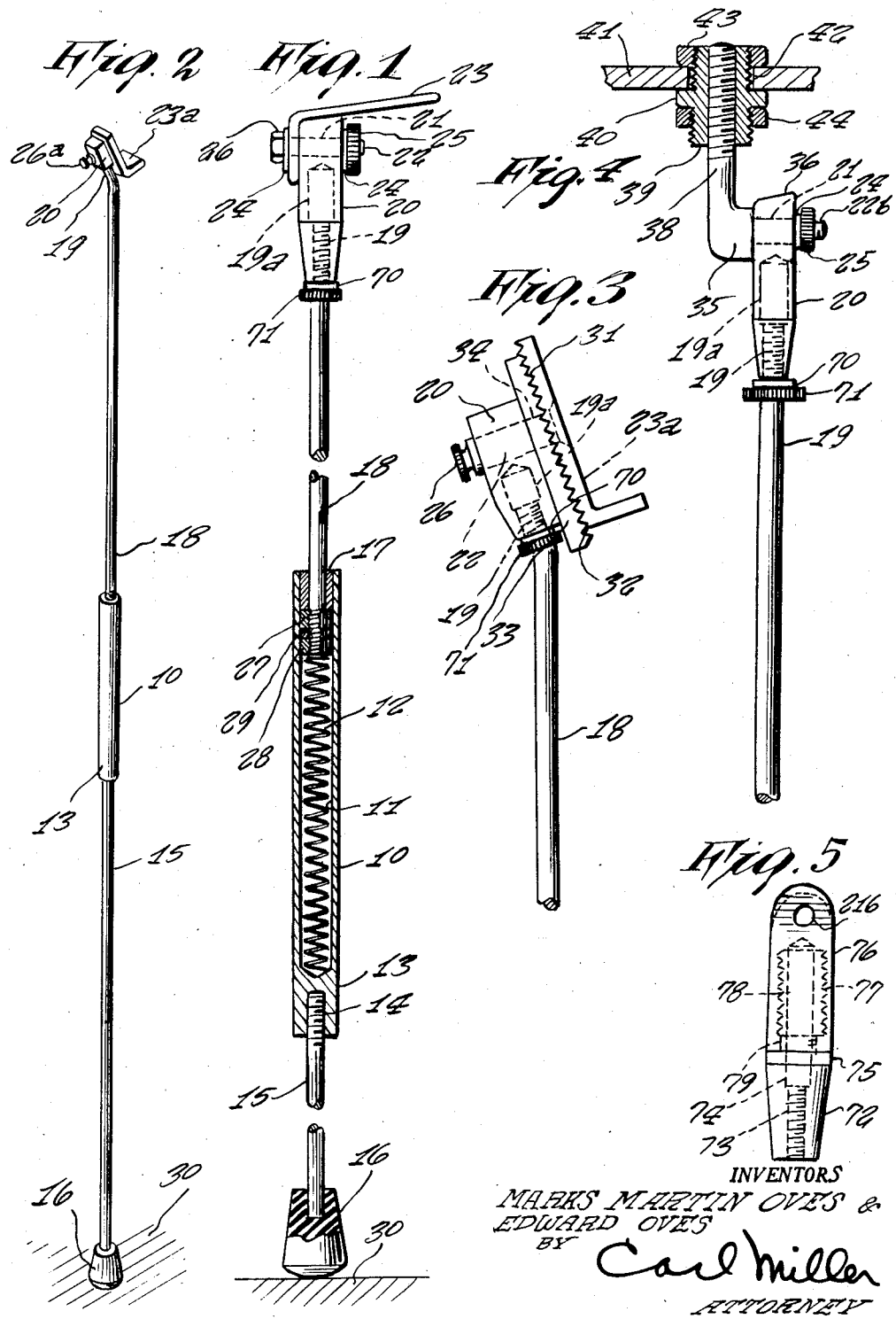

2,861,767

UNIPOD ACCORDION SUPPORT

Marks Martin Oves, Bronx, and Edward Oves,
Long Island City, N. Y.

Application October 30, 1953, Serial No. 389,372

1 Claim. (Cl. 248—356)

This invention relates to supports.

It is an object of the present invention to provide a compression jack for supporting accordions and other musical instruments, cameras, television cameras, projectors and surveying instruments.

It is another object of the present invention to provide a support which may be used either singly or in multiples to support varying objects.

Other objects of the present invention are to provide a support bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a side elevational view of the invention shown partly in section;

Fig. 2 is a perspective view of a modified form of the invention;

Fig. 3 is an enlarged fragmentary side elevational view of certain parts of the structure shown in figure;

Fig. 4 is a view similar to Fig. 3 of a still further modified form of the invention;

Fig. 5 is a front elevational view of a still further modified form of the invention.

Referring now to the figures, and more particularly to Fig. 1, 10 represents a hollow cylindrical member of tubing or solid stock having a longitudinal bore 11 in which is positioned a spring 12, the lower end of cylinder 10 being closed at 13, whereby to support the lower end of spring 12. The portion 13 is internally threaded as at 14 and has screwed therein an externally threaded stationary rod 15, the lower end of rod 15 being provided with a fixed rubber bumper or shoe 16. A bushing 17 is suitably secured in the open upper end of cylinder 10 and slidably receives therethrough a plunger rod 18 having an upper end externally threaded and screwed into an internally threaded opening 19 provided in an adjustable extension 20. Block 20 is also provided with a smooth, thread release bore 19a. A washer 70 and an adjustment lock nut 71 are provided on rod 18 adjacent block 20. The block 20 is provided with a transverse bore 21 which receives therethrough a stud 22 on one end of which is mounted an L-shaped plate 23. Washers 24 are provided on each end of stud 22, a knurled nut 25 being screwed onto one end of stud 22 while a hexagonal nut 26 is screwed on the other end. A first piston nut 27 is screwed on to the externally threaded lower end of rod 18 within cylinder 10, a second piston nut 28 being screwed therebelow while a leather washer 29 is provided intermediate piston nuts 27 and 28. With the bumper or shoe 16 resting on a supporting surface 30, the L-shaped bracket 23 will support the corner of an accordion or the like, the piston nuts 27, 28 moving downwardly to compress spring 12 in accordance with the weight of the accordion or other object. The device may be used singly or in multiples (for example, tripods) to support musical instruments in general, cameras, television equipment, projectors and surveying instruments, the resiliency of the supports preventing damage to the instruments supported thereon.

Referring now particularly to Fig. 3, there is shown a modified form of the invention wherein the stud 22 is secured to an L-shaped plate 23a having a serrated face 31 which engages the correspondingly serrated face 32 of a second plate 33, the plate 33 having a circular opening 34 therethrough which receives the stud 22 therethrough. It will be noted that the upper end of rod 18 is bent slightly from the vertical. In other respects, the form of the invention shown in Fig. 3 is the same as that shown in Fig. 1 and like reference numerals identify like parts throughout the several views.

Referring now particularly to Fig. 4, there is shown a still further modified form of the invention wherein the rod 19b is provided with a straight upper externally threaded end which is again screwed into block 20. An L-shaped rod 38 is integrally formed at one end of stud 22b, the latter being secured to block 20 by washer 24 and knurled nut 25. The rod 38 is externally threaded at the upper end, a member 39 internally threaded being screwed thereon. The member 39 is also externally threaded and is integrally formed intermediate its ends with a flanged portion 40 which supports a plate 41 having an opening 42. A lock nut 43 is screwed onto the upper end of member 39 while a second lock nut 44 is screwed onto the bottom. In other respects the form of the invention shown in Fig. 4 is the same as that shown in Fig. 1.

Referring now particularly to Fig. 2, there is shown a still further modified form of the invention wherein an L-shaped bracket 23 is integrally formed with a stud, not shown, passing through transverse bore 21 of block 20 and secured therewithin by enlarged knurled nut 26a. In other respects the form of the invention shown in Fig. 2 is the same as that shown in Fig. 1, and like reference numerals identify like parts throughout the several views.

Referring now particularly to Fig. 5, there is shown a still further modified form of the invention wherein a spindle 72 is internally threaded at 73 and screwed onto the upper end of plunger rod 18, the spindle having a smooth bore 74. The upper end of spindle 72 is provided with an internally threaded sleeve 75 into which screws the externally threaded, lower end of an adjustment sleeve 76. Sleeve 76 is provided with the usual transverse bore 21b as well as an internally threaded bore 77 into which is screwed externally threaded spindle 78. Sleeve 76 is also provided with smooth bore 79 communicating with bore 74. Thus, a micrometer adjustment extension is provided. In other respects the form of the invention shown in Fig. 5 is the same as that shown in Fig. 1.

While various changes may be made in the detail construction, it shall be understood that such changes shall be within the spirit and scope of the present invention as defined by the appended claim.

Having thus set forth and disclosed the nature of our invention, what is claimed is:

A support comprising, in combination, a substantially vertical cylindrical sleeve closed at the lower end, a piston and piston rod slidably received in the upper end of said sleeve, a compression spring disposed within said sleeve and acting between said closed lower end and said piston, the outer extremity of said piston rod having an offset portion angularly inclined relative to said piston rod, a block carried by said offset portion, means for adjusting the vertical position of said block relative to said offset portion, a plate carried by said block having a flat serrated face and a bore extending transversely relative thereto, a substantially L-shaped plate having a serrated face displacable in engagement with said serrated face of said block plate and having a stud adjacent to one end thereof adapted to extend through said transverse bore, and said adjustment means also being adapted to fix the vertical position of said plate and said block relative to said piston rod.

References Cited in the file of this patent

UNITED STATES PATENTS

| 456,877 | Bingman | July 28, 1891 |
| 480,441 | Siar et al. | Aug. 9, 1892 |
| 844,670 | Frankel | Feb. 19, 1907 |
| 1,820,950 | Schulstadt | Sept. 1, 1931 |
| 2,051,420 | Renholdt | Aug. 18, 1936 |
| 2,218,142 | Becker et al. | Oct. 15, 1940 |

FOREIGN PATENTS

| 242,551 | Great Britain | of 1925 |
| 494,642 | Germany | of 1930 |